UNITED STATES PATENT OFFICE.

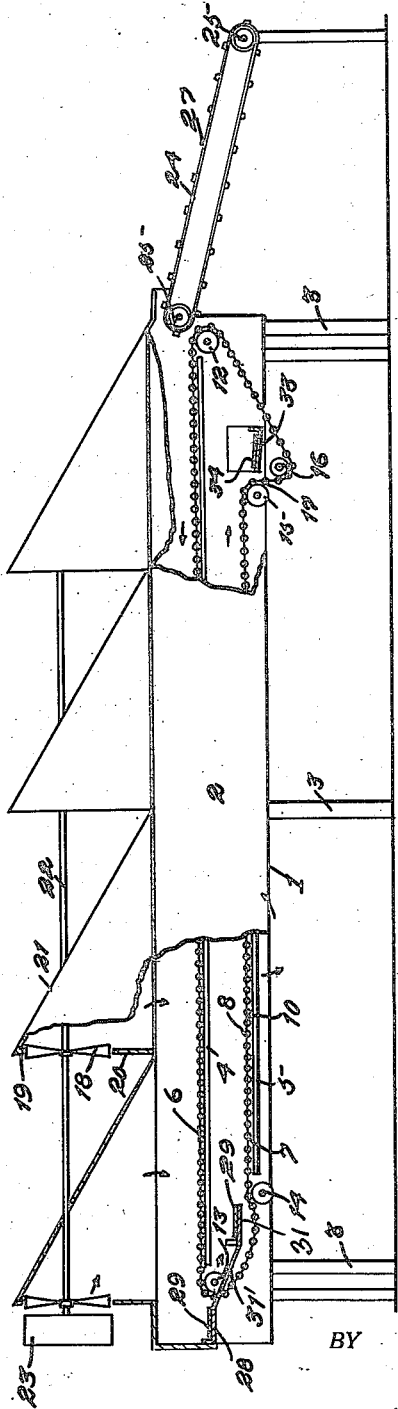

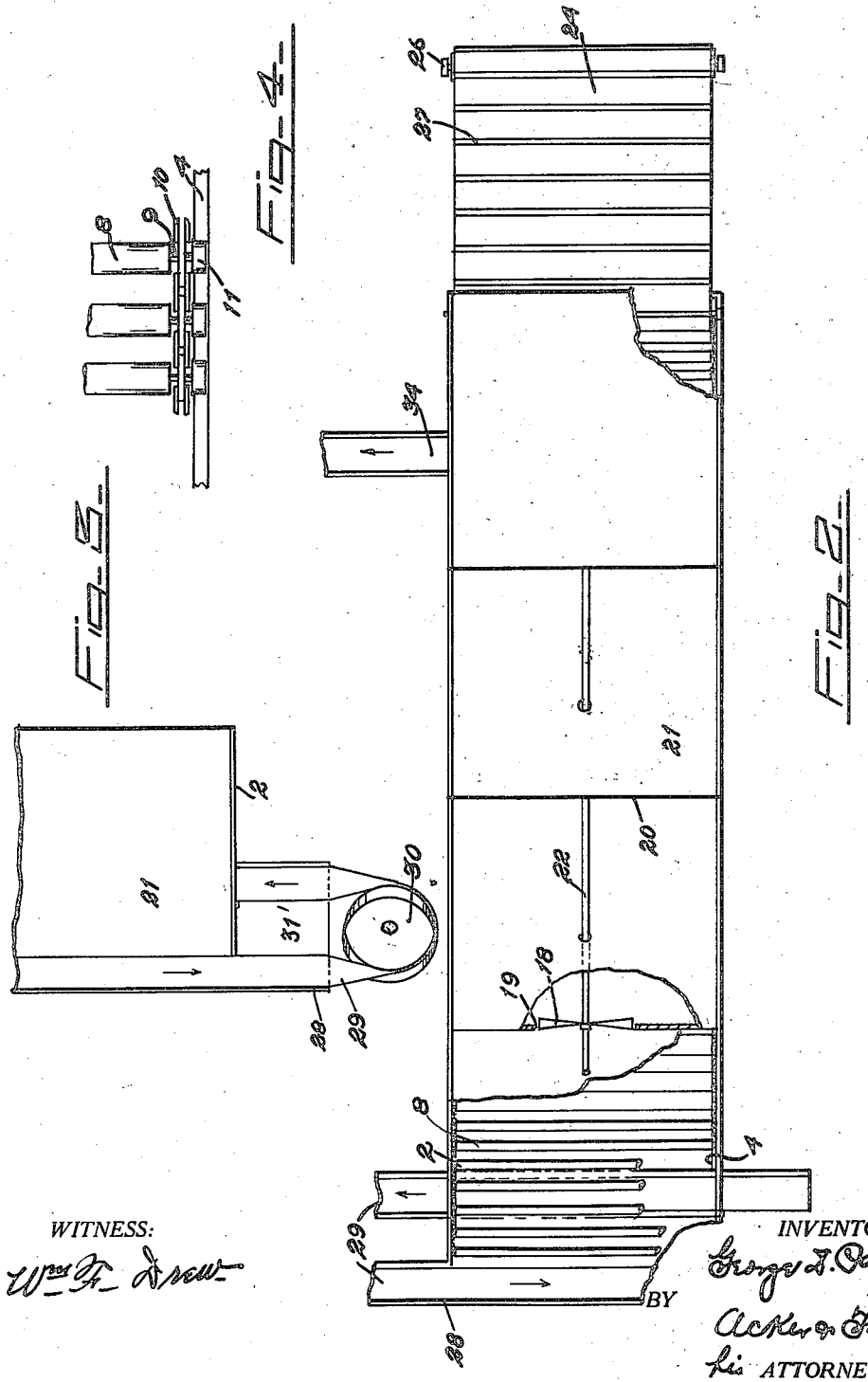

GEORGE D. PARKER, OF RIVERSIDE, CALIFORNIA.

DRYING APPARATUS.

1,256,825.    Specification of Letters Patent.    Patented Feb. 19, 1918.

Application filed June 27, 1917. Serial No. 177,223.

*To all whom it may concern:*

Be it known that I, GEORGE D. PARKER, a citizen of the United States, residing at Riverside, in the county of Riverside and State of California, have invented certain new and useful Improvements in Drying Apparatus, of which the following is a specification.

In packing houses, particularly those packing citrus fruits, it has been found desirable to wash the fruit in order to better present the same for market, and in order to expedite the packing of the fruit, after being washed, the same is usually passed through a suitable drying apparatus for the absorption of the moisture therefrom. The driers at present employed consist of a housing with an endless conveyer passing therethrough, and on the upper run of which the fruit is supported in its travel through the housing, the lower run returning empty, so in order to construct a drier of sufficient capacity and to operate the conveyer thereof at a fair rate of speed to thoroughly dry the fruit as it passes through the drier, the drier is necessarily of a considerable length and therefore occupies considerable floor space in the packing house.

The present invention relates to driers of the conveyer type, and has for its principal objects to provide one of large capacity and wherein the fruit rests on and is conveyed therethrough in a zig-zag path, preferably from one end to the other thereof, thus lengthening the period of time that the fruit is traveling through the drier without reducing the speed of the conveyer and without increasing the floor space required to operate said drier.

The invention consists primarily in providing in a drier a plurality of superimposed conveyer flights moving successively from top to bottom in opposite directions and employing in connection therewith means for transferring the fruit from the upper surface of the end of an upper flight onto the upper surface of the corresponding end of a successive flight, whereby the fruit rests on and is conveyed successively from end to end of the drier housing alternately in opposite directions, and is subjected to a drying element in its travel within the said drier.

With the above mentioned and other objects in view, the invention consists in the novel construction and combinations of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in broken side elevation, illustrating the preferred embodiment of my invention.

Fig. 2 is a view in broken top plan.

Fig. 3 is a view in detail of the transfer conveyer.

Fig. 4 is a view in detail of one end of several of the conveyer rolls.

Referring more particularly to the several views of the drawings, wherein like characters of reference designate corresponding parts,—1 indicates a suitable drier housing, comprising the side walls 2 supported on legs 3 or other suitable standards. To the inner face of the side walls 2 of the housing 1 are secured the longitudinally extending parallel spaced upper and lower trackways 4 and 5, which support respectively the upper and lower flights 6 and 7 of a suitable endless conveyer. The conveyer is preferably formed of spaced supporting rolls 8 extending transversely of the drier housing, and each is provided at its opposite ends with a bearing 9 rotatable in a suitable bearing link of a connecting chain 10. The extreme opposite ends of the rolls 8 are provided with supporting rollers 11 which run on the trackways 4 and 5 and cause the rolls 8 to be rotated to rotate the fruit during the movement of the respective conveyer flights in opposite directions.

Suitable pulleys 12 and 13 at opposite ends of the housing and over which the endless conveyer travels, support the same, and one of said pulleys is driven in any suitable manner to cause the conveyer to travel in the direction of the arrow—Fig. 1 of the drawings. The lower run 7 operates over the supporting idler pulley 14 at one end of the trackway 5, and at the opposite end of the trackway operates over a similar idler 15 and under a corresponding idler 16 positioned below said idler 15, which causes a step 17 to be formed at the rear end of said lower conveyer flight 7.

In the present disclosure the drying medium employed is air supplied by fans 18 positioned in openings 19 in the vertical cover walls 20, and the air is directed downwardly onto the fruit as conveyed by the downwardly inclined cover walls 21, the air passing over and around the fruit and between the conveyer rolls, and is discharged from the drier housing through the open bottom thereof. The fans 18 are all mounted on a single shaft 22 driven by power applied to the band wheel 23 at one end thereof.

The washed fruit to be dried is fed to the receiving end of the drier by any suitable conveying means, and for purposes of illustration there is employed an endless conveyer belt 24 operating at its ends over rolls 25, and one of which is driven by power supplied to a pulley 26 at one end thereof. To prevent the rolling of the fruit relatively to the feed belt, suitable cleats or slats 27 extend transversely of the upper surface of the belt 24, as in Figs. 1 and 2 of the drawings.

To transfer the fruit from the discharge end of the upper flight to the receiving end of the succeeding flight immediately below the upper flight, a suitable transverse support 28 is positioned at the rear of the drier housing, and the same supports a transfer belt 29 operating in the direction of the arrow—Figs. 2 and 3 of the drawings. The belt passes at one end over a suitable angularly disposed idler 30 and travels toward the drier housing on a suitable support 31 positioned intermediate the upper and lower conveyer flights 6 and 7 at one side of the idler 14. The supports 28 and 31, which are disposed in different horizontal planes, are connected adjacent the idler 30 by an inclined runway 31' and downwardly over which the fruit rolls by gravity from the upper to the lower flight of the conveyer belt 29.

Disposed transversely to the step 17 above the idler 16 is a horizontal support 33 over which an endless conveyer belt 34 travels, said belt receiving the fruit from the discharge end of the lower drier flight 7 and removing the same from the drier to any suitable place of deposit.

The operation of my invention may be briefly described as follows:—The fruit from the washer (not shown) is delivered onto the belt 24 and is conveyed thereby onto the upper run or flight 6 of the drier conveyer which carries the fruit through the housing 1 at which time it is subjected to the drying currents of air generated by the fans 18. After the fruit has been carried the full length of the upper run 6, it passes therefrom onto the upper flight of the transfer belt or conveyer 29 which carries it to one side of the upper flight 6 and onto the inclined runway 31' down which it rolls by gravity onto the lower flight of the transfer belt 29 which carries it onto the receiving end of the lower flight 7 of the drier conveyer. After being again conveyed horizontally of the drier in a direction reverse to that of its first travel, the dried fruit is now delivered onto the discharge belt 34 which removes the same to a suitable machine or apparatus for further treatment.

While I have illustrated a drier conveyer having two flights or runs, one arranged above the other, it is understood that the greater the number of runs or flights employed the greater the distance of travel of the fruit longitudinally of the drier housing is obtained without increasing the length of said housing, so if greater travel of the fruit within the drier is required, more flights or runs may be employed without departing from the spirit of my invention.

Having thus described my invention, what I claim as new and desire to protect by Letters Patent is:—

1. A drier comprising an open bottomed housing, means for feeding fruit to be dried thereto, and means within said housing for continuously rotating and for directing the fruit therein alternately in opposite directions from one end to the opposite end of said housing, and means for forcing air downwardly onto the fruit for drying the same as it is conveyed therethrough and maintained in agitation.

2. A drier comprising a housing, means for feeding fruit to be dried thereto, and an endless movable means comprising parallel spaced interconnected rollers within said housing for supporting and conveying and continuously rotating the fruit therein alternately in opposite directions in successively lower horizontal planes from one end to the opposite end of said housing, and means for forcing air downwardly through said housing and said endless movable means for drying the fruit as it is conveyed through said housing.

3. A drier comprising an open bottomed housing, a plurality of horizontally disposed longitudinally movable conveyer flights extending longitudinally thereof and arranged one above the other within said housing, said flight comprising interconnected parallel spaced rotatably mounted conveyer rolls, means for feeding fruit to be dried onto the upper surface of one end of the uppermost conveyer flight, means for transferring the fruit from the upper surface of the opposite end of the uppermost conveyer flight to the upper surface of the corresponding end of a succeeding conveyer flight, means for removing the fruit from the upper surface of the opposite end of said last mentioned conveyer flight, and means for forcing air downwardly through the housing and through the open bottom thereof for drying the fruit as rotated and conveyed.

4. A drier comprising a housing open at its bottom, a horizontally disposed open conveyer comprising interconnected rotatably mounted conveyer rolls, said conveyer having superimposed runs extending longitudinally within said housing, succeeding conveyer runs commencing at the uppermost traveling in opposite directions, means for feeding fruit to be dried onto the upper surface of the uppermost run, means for receiving and removing the fruit successively from the upper surface of the upper runs to the upper surface of succeeding runs and means for forcing air downwardly in said housing from top to bottom and between the rolls of said superimposed runs for drying the fruit as conveyed.

5. A drier comprising a housing, a supporting roll therein at each end thereof, an endless conveyer comprising inter-connected rotatably mounted conveyer rolls, said conveyer passing around said rollers and supported thereby, said rollers dividing the conveyer into upper and lower flights, means for driving one of said rollers for operating said flights in opposite directions, means for supplying fruit to be dried to one end of the upper surface of said uppermost flight of said conveyer, means for receiving the fruit from the opposite end of said uppermost flight for conveying and delivering the same onto the upper surface of the adjacent end of the lower flight, means for receiving and removing the fruit from the opposite end of said lower flight, and means for drying the fruit as rotated and conveyed through said housing.

6. A drier comprising a housing, a plurality of horizontally disposed longitudinally movable conveyer flights extending longitudinally thereof and arranged one above the other within said housing, means for feeding fruit to be dried to one end of the uppermost conveyer flight, a transverse conveyer extending transversely of the adjacent ends of the upper and succeeding conveyer flights for transferring the fruit from one end of an upper conveyer flight onto the upper surface of the corresponding end of a lower flight traveling in an opposite direction, means for receiving the dried fruit from the discharge end of the lowermost conveyer flight, and means for drying the fruit while in said housing.

7. A drier comprising a housing, an endless traveling conveyer therein having an upper run and a lower run, said conveyer capable of supporting the fruit to be dried on the upper surfaces of the upper and lower runs thereof and for rotating the fruit as conveyed thereby, means for feeding the fruit to be dried onto one end of the uppermost run, means for receiving the fruit from the opposite end of said run and for transferring the same to the upper surface of the corresponding end of the lower run, means for receiving the fruit from the opposite end of the lower run, and means for causing an air circulation within the housing to dry the fruit as conveyed therethrough.

8. A drier comprising a housing, an endless traveling conveyer therein having an upper run and a lower run, said conveyer capable of supporting the fruit to be dried onto the upper surface of the upper and lower runs thereof and for rotating the fruit as conveyed thereby, said lower run formed adjacent one end with a step portion, means for feeding fruit onto one end of the uppermost run, means for receiving the fruit from the opposite end of said run and for transferring the same onto the upper surface of the corresponding end of the lower run, and means within said stepped portion of said lower run for receiving the fruit from the opposite end thereof for removing the same from the drier, and means for causing an air circulation within the housing to dry the fruit as conveyed therethrough.

9. A fruit drying apparatus, comprising an open bottom housing, means within said housing and extending longitudinally thereof for rotating and for directing the fruit therein alternately in opposite directions from one end to the opposite end of said housing in successive different horizontal planes, and means for forcing air onto the fruit as conveyed through said housing for the drying of the same.

10. An apparatus for the described purpose, the same comprising a longitudinally disposed open bottom housing, means for dividing the interior thereof into superimposed runways and rolling fruit therethrough in different horizontal planes and in opposite directions, and means for delivering air onto the fruit as propelled through said housing.

In testimony whereof I have signed my name to this specification in the presence of two subscribing witnesses.

GEORGE D. PARKER.

Witnesses:
S. A. MARKS,
CHAS. F. BROOKHART.